(No Model.)
H. W. FERLING & E. HEIM.
HARROW.
No. 568,244. Patented Sept. 22, 1896.
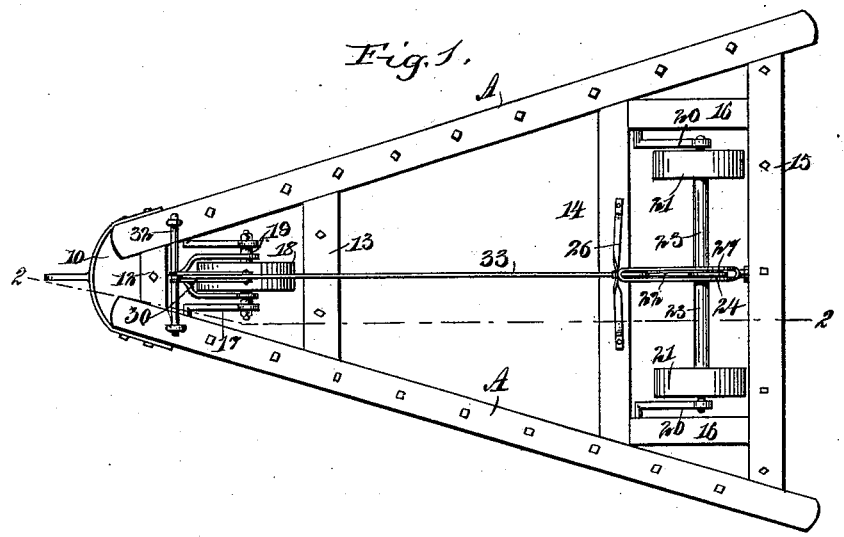
WITNESSES:
INVENTORS
H. W. Ferling
BY E. Heim
ATTORNEYS.

UNITED STATES PATENT OFFICE.

HERMAN W. FERLING AND EMIL HEIM, OF LITTLE ROCK, ARKANSAS.

HARROW.

SPECIFICATION forming part of Letters Patent No. 568,244, dated September 22, 1896.

Application filed July 10, 1896. Serial No. 598,679. (No model.)

*To all whom it may concern:*

Be it known that we, HERMAN W. FERLING and EMIL HEIM, of Little Rock, in the county of Pulaski and State of Arkansas, have invented a new and Improved Harrow, of which the following is a full, clear, and exact description.

The object of our invention is to provide a harrow with wheels and means for raising and lowering the said wheels within the line of the teeth of the harrow for the purpose of bringing the teeth of the harrow in engagement with the ground to enter the same a predetermined depth, and to also raise the teeth entirely from the ground when the harrow is to be transported from place to place or is to be carried over an obstruction, in which event the harrow will be entirely supported by the aforesaid wheels.

A further object of the invention is to provide a simple and readily-operated device for raising and lowering the wheels and holding them in the position determined upon.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1 is a plan view of the improved harrow, the wheels being raised. Fig. 2 is a longitudinal vertical section through the harrow, taken practically on the line 2 2 of Fig. 1, illustrating the wheels raised from the ground; and Fig. 3 is a view similar to Fig. 2, illustrating the wheels in engagement with the ground and the harrow-teeth elevated therefrom.

In carrying out the invention the harrow A may be of any approved type, that shown in the drawings being of substantially A or V form, its side pieces being connected at the front by a clevis-bar 10 and at intervals between the front and rear by cross-bars 12, 13, 14, and 15. The two rear cross-bars 14 and 15 are connected near their ends by longitudinal bars 16, as is best shown in Fig. 1.

A crank-axle 17 is journaled in the side bars of the harrow adjacent to the front cross-bar 12, and on the straight portion of the crank-axle, or that portion intermediate of its arms, a single wheel 18 of predetermined diameter is mounted to revolve, and on this portion of the axle spacing-sleeves 19 are located at each side of the said wheel. The teeth 11 of the harrow are of any approved type, and may be given any desired arrangement.

A second crank-axle 20 is journaled in the longitudinal beams 16, and adjacent to each arm of this rear axle a wheel 21 is mounted to revolve, while parallel links 22 are pivotally attached to the rear axle at its center, and between the links 22 and the wheels 21 spacing-sleeves 23 are placed. Preferably in the construction of both axles the arms are removably attached to the central portions, so that when the central portions of the axles are drawn from the arms all parts carried by the former may be quickly and readily removed.

A forwardly and upwardly arched loop-like guide 24 is secured to the central portion of the rear cross-bar 15 and extends upwardly and forwardly over to the next cross-bar 14, where it is supported by an upright rod 26, or the equivalent of the same. Openings or apertures 25 are made in the arched loop-guide 24 at intervals in its length, and a lever 27 is fulcrumed at 28 upon the cross-bar 14, preferably at the rear of the support 26 for the upper guide 24, and this lever is made to pass between the links 22 and is pivotally connected with said links, and the lever is furthermore passed through the loop-guide 24 and is held in any desired position in the said guide by passing a pin 29 or its equivalent through any of the openings 25 in the said guide and through a registering opening in the lever. Links 30 are also preferably attached to the forward axle, one at each side of the wheel 18, and a second single link 31 is pivoted at its upper end between the parallel links 30 and upon a cross-bar 32, located at the upper forward portion of the harrow-frame. A long link 33 is pivotally connected with the double end links 22 and 30.

In the operation of the harrow, when the teeth are to enter the ground to any special depth the lever 27 is carried to the upper position shown in Fig. 2 and secured in that position, whereupon the forward and the rear wheels will be carried well up in the frame of the harrow. If the teeth are to enter the ground a predetermined distance only, the wheels 18 and 21 are lowered, so that after the teeth have entered the ground the specified distance said wheels will engage with the ground, and in the event that the teeth of the harrow should encounter any obstruction which they cannot readily pass the lever is carried downward a certain distance to bring the wheels on the ground and carrying the crank-axles to a lower vertical position, (shown in Fig. 3,) and thereby raising the harrow-teeth a considerable distance above the ground, permitting the harrow to pass over such obstruction, and when the harrow is to be carried from the field, or is to be conveyed to a field, the wheels are lowered to their lowermost position, as shown in Fig. 3, and the harrow will be entirely supported by them.

The harrow may be prevented from clogging by simply pressing the lever 27 downward, whereas ordinarily the harrow must be turned over.

The harrow may be made of any material. Preferably the frame is of wood.

The harrow may be built by most ordinary workmen and repaired by the average laborer, and a seat may be provided, if desired.

The harrow may be used with advantage upon planted ground, as it can be adjusted to skim the crust and not injure the seed.

Having thus described our invention, we claim as new and desire to secure by Letters Patent—

The combination, with a harrow-frame, crank-arms pivoted to the sides of the harrow-frame at the front and at the rear, and removable rods passed through transversely alining crank-arms, forming crank-axles in connection with said arms, and wheels mounted to revolve on the rod-sections of the axles, of links attached to the rod-sections of the axles and extended upward above the frame, a connecting-rod uniting the upper portions of the said links, a guide-arm pivotally attached to the forward link and to the forward portion of the harrow-frame, a guide-loop secured at the rear of the rear axle, being arched upwardly and forwardly over the same, a lever fulcrumed on the frame in front of the rear axle and pivoted to the link of the rear axle and passed between the members of the guide-loop, and a locking-pin arranged to enter openings in the guide-loop and openings in the lever, as and for the purpose specified.

HERMAN W. FERLING.
EMIL HEIM.

Witnesses:
GEO. P. C. RUMBOUGH,
T. J. BEASLEY.